United States Patent Office 3,277,034
Patented Oct. 4, 1966

3,277,034
HEAT CURABLE COATING COMPOSITION OF EPOXIDES, FATTY ACIDS AND AMINO RESINS
Jack B. Boylan, Cincinnati, Ohio, assignor to Emery Industries, Inc., Cincinnati, Ohio, a corporation of Ohio
No Drawing. Filed May 11, 1962, Ser. No. 194,198
8 Claims. (Cl. 260—21)

This invention relates to novel polymerizable, heat curable compositions; to the resulting cured compositions; and to methods for preparing said curable compositions. More particularly, it is directed to a stable coating composition which, when applied to a steel or other substrate and baked thereon, provides the advantages of a conventional epoxy ester primer coat and of a high bake enamel top coat into a single, one-coat composition.

The available epoxy compositions, when fully compounded and ready to be used, exhibit poor stability and can be stored for only relatively short periods of time before gelation or other product degradation occurs. This is true even in the case of the products which must be baked to effect cure. Moreover, many of the epoxy compositions on the market tend to become yellow and to evidence a chalky surface with age. For these reasons, epoxy resins have heretofore been employed primarily to provide a primer coat over which the finished coat (whether or not pigmented to form an enamel) has later been applied.

It is an object of this invention to provide an epoxy finish which is free of the foregoing disadvantages, and which is well adapted to receive a pigment, thus providing a so-called one coat system for a wide variety of applications.

The present invention rests on the discovery that the foregoing objects can be attained by blending (1) an adduct formed by heating a diepoxy compound of the alicyclic type with a mixture of fatty acids comprised in major portion of so-called dimer acids ($C_{36}$ dicarboxylic acids formed by the polymerization of $C_{18}$ unsaturated fatty acids) along with about 2 to 25% by weight of a $C_8$–$C_{18}$ monocarboxylic acid; (2) an amino resin derived from the condensation of formaldehyde with a polyfunctional nitrogen compound such as urea, melamine, triazine, and diazine, as well as the alkylated products derived by the treatment of such resins with butanol, octanol or other aliphatic alcohols; and (3) a catalyst of the type used to promote esterification and/or etherification reactions such, for example, as stannous octoate or stannic chloride.

The adduct referred to above is obtained by heating the epoxy compound and the fatty acid mixture in the proportion of about 1.5 to 2.5 gram equivalents of the epoxy material for each gram equivalent of the acid mixture, a preferred ratio being about 1.8–2.2 to 1. Adduct formation proceeds at temperatures of about 150 to 225° C., the reaction being conducted for one-half to four or more hours, with the end of the reaction being signaled when the acid number of the product is reduced to a level below 20 and preferably below 10. Heating at 180° C. for 1½ hours usually gives an adduct of the preferred type. The fatty acid-epoxy adducts referred to herein inherently contain both epoxy as well as hydroxy groups, both of said groups being involved in the final curing reaction of the resin.

The resulting adduct, preferably admixed with an inert solvent such as xylene or toluene to obtain a pourable product, is then admixed with from about 10 to 100% of the amino resin and from about 0.5 to 10% of the stannous octoate or other catalyst employed, said percentages based on the weight of adduct present. Additional quantities of a suitable solvent may be added as required to give a product having the desired consistency for the intended brushing, spray, or other application. If a pigmented product is required, pigment is also worked into the mixture in the required proportions at an appropriate stage, this and the other blending, diluting and mixing steps described in this paragraph being carried out in accordance with manufacturing practices commonly employed in the art.

The resulting compositions are capable of being stored indefinitely at ambient temperatures without suffering gelation or other deleterious effects. However, once the mixture has been applied in the form of a thin film upon a suitable substrate, this film can readily be cured thereon at temperatures of from about 200 to 350° to form a hard, adherent and durable coating which does not become significantly yellow or chalky with age. Moreover, the coating is one having good resistance against attack by a wide variety of solvents and other chemicals, and it also stands up well even under the most adverse environmental conditions. Curing times at said temperatures normally range from 10 to 60 minutes, with the relatively longer times within said range being employed with lower temperatures, and vice versa.

The epoxy compounds which can be used in a practice of this invention are alicyclic diepoxides which normally contain from about 8 to 20 carbon atoms. Representative compounds falling in this class which can be employed with success in a practice of this invention include:

3,4-epoxy-6-methylcyclohexylmethyl-3,4-epoxy-6-methylcyclohexanecarboxylate
3,4-epoxy-(3 and/or 4)-methylcyclohexylmethyl 3,4-epoxy-(3 and/or 4)-methylcyclohexane carboxylate
3,4-epoxy-(2 and/or 5)-methylcyclohexylmethyl-3,4-epoxy-(2 and/or 5)-methylcyclohexanecarboxylate
3,4-epoxycyclohexylmethyl-3,4-epoxycyclohexanecarboxylate
1-epoxyethyl-3,4-epoxycyclohexane
2,3-5,6-diepoxy-octahydro-4,7-methaniondene Said epoxides, in general, possess one or another of the following structural formulae, wherein the various "R" radicals represent hydrogen atoms or lower alkyl groups:

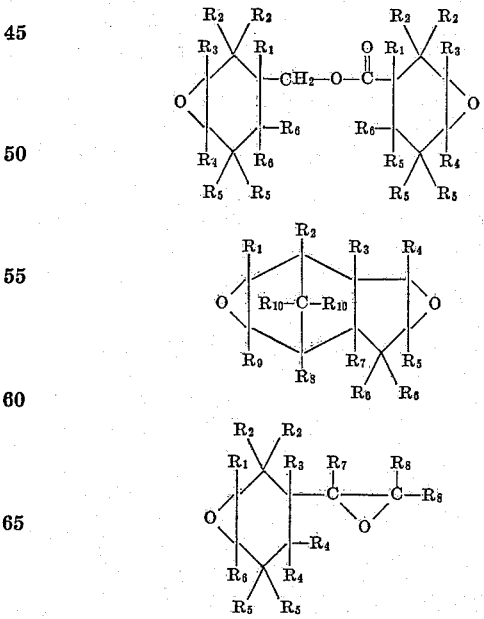

The fatty acid mixture used in forming the adduct contains from about 2 to 25% by weight of a monocarboxylic acid having a chain length of from about 8 to 18 carbon atoms. Representative acids which fall in this category are caprylic, pelargonic, capric, lauric, myristic, palmitic, palmitoleic, oleic and stearic acids. Another useful monocarboxylic material is that mixture of saturated and unsaturated $C_{18}$ acids which is present as the unpolymerized portion of the reaction product obtained on polymerizing $C_{18}$ unsaturated fatty acids to form the dimer material comprising the balance of the fatty acid mixture employed in producing the adduct hereof. Dimerization processes of this character are well known and form the subject of numerous U.S. patents, including Nos. 2,482,761, 2,793,220, 2,793,221 and 2,955,121. In carrying out said dimer-forming operations, unsaturated fatty acids or mixtures of such acids (usually admixed with saturated fatty acids), all of essentially $C_{18}$ chain length, are heated in the presence of water, or in the presence of both water and an active clay mineral, to induce polymerization.

The polymeric fatty acid reaction mixtures so prepared contain from about 30 to 75% by weight of acid polymer, with the balance of the mixture representing $C_{18}$ monocarboxylic, monomer acids of one type or another. The polymer fraction consists essentially of dimer ($C_{36}$ dicarboxylic acids) together with amounts up to about 20–22% of trimer. However, the trade customarily refers to this dimer-trimer mixture as "dimer," and this practice is followed herein. These polymerization reaction products can be used per se to form the adducts employed in a practice of this invention, provided the $C_{18}$ monomer content does not exceed 25% or is reduced by distillation to a level below said percentage. On the other hand, the monomer fraction may be removed substantially entirely, with some other $C_8$–$C_{18}$ acid, as pelargonic or the like, then being blended with the remaining dimer, polymer fraction in the desired proportion. Again, the $C_{36}$ dicarboxylic fraction may be distilled from the mixture and used along with a suitable $C_8$–$C_{18}$ acid to form the adduct. All such products can be used in the form in which they are recovered from the polymerization unit, or they can be given a partial or complete hydrogenation treatment to reduce unsaturation in the product before reacting it with the epoxy compound to form the adduct. This is true for both monomeric as well as polymeric acid fractions.

The amino resin which is blended with the adduct to form a heat-curable film is one of the type formed by condensing formaldehyde with a polyfunctional nitrogen compound such as urea, melamine, triazine or diazine. It may also be an alkylated amino resin of the type formed by reacting said formaldehyde condensates with an alkyl alcohol such as butanol or octanol. The butylated melamine formaldehyde resin constitutes a preferred compound for use in practicing the present invention.

The catalyst added to the composition is, as indicated above, one of the type conventionally used in esterification and etherification reactions. Representative catalysts of this class are stannic chloride, stannous octoate, titanium chloride and tetraalkyl titanates and their condensed derivatives.

In carrying out the examples given below, which illustrate the invention in various of its embodiments, approximately 2 gram equivalent weights of the indicated epoxy compound were reacted with approximately 1 gram equivalent of a mixture of fatty acids comprised of a polycarboxylic polymer of an unsaturated $C_{18}$ acid (polymerized at elevated temperatures in the presence of water and a clay catalyst) and a small percentage of a monocarboxylic acid of $C_8$–$C_{18}$ chain length. This reaction, which was productive of an epoxy-fatty acid adduct, was carried out in a one liter flask fitted with an agitator, a thermometer, a direct return water-cooled condenser, and a gas inlet tube through which nitrogen was passed to supply the system with a nitrogen atmosphere. In each preparation, the epoxy compound and the fatty acids were heated in the flask to 180° C. with agitation, care being observed to control the exothermic reaction taking place at about 130–140° C. The temperature was maintained at 180° C. for periods varying from 1½ to 4 hours, the end point being taken as that when an acid number of about 7 was reached. The adduct was then cooled and xylene was added to provide a 75% solids solution.

To the above solution was then added 33% by weight on a solid basis, in terms of the weight of the adduct, of a 55% solids solution in butanol-xylene of an alkylated melamine formaldehyde resin (Cymel 248–8, a product of American Cyanamid Company is described in "Synthetic Resins in Coatings," Part III, Melamines, page 14, August 1960, by Harold P. Preuss, published by Noyes Development Corporation, Pearl River, New York, as a buylated melamine-formaldehyde resin solution. Additional physical properties of this Cymel 248–8 resin are given in Supplement II to Handbook of Material Trade Names, pages 65–66, 1957, by Zimmerman and Lavine), together with about 4% by weight of stannous octoate, also based on the weight of adduct. The resulting mixture was then reduced to a 50% solids solution by adding Solvesso 100 solvent, as required. The products so obtained, in some cases combined with $TiO_2$ or other pigment, represent the compositions of this invention, as do the baked enamels or coatings obtained on heating, or curing a thin layer of the mixture at elevated temperatures.

In evaluating the composition, films having a thickness of about 0.003 inch were cast on plate glass, on polished steel and on white Vitrolite glass. The coated articles were then heated for 30 minutes at 300° F. The extent to which the samples yellowed on exposure to ultraviolet light was measured by the Gardner automatic multipurpose reflectometer. The yellow index (Y) of each Vitrolite sample was first determined according to the formula $$Y = \frac{\text{amber reading} - \text{blue reading}}{\text{green reading}} \times 100$$

The Vitrolite samples were then exposed to a source of ultraviolet light for several hundred hours, and the Y value again determined. The difference between the initial and the exposed Y values is expressed as $\Delta Y$, a low differential being most desirable.

In some instances the Vitrolite panels were also subjected to hardness tests using a Sward hardness rocker so calibrated as to give a reading of 100 on glass. Here a high reading is desirable.

The steel panels were subjected to direct and reverse impact tests using a Gardner variable impact tester. Here a high value is desirable, the machine affording no values higher than 160 in. lbs. Film failure is indicated by cracking of the film or in the parting thereof from the substrate.

*Example I*

In this example the adduct was one of 3,4-epoxy-6-methylcyclohexylmethyl - 3,4 - epoxy - 6 - methylcyclohexanecarboxylate (301 g.), a mixture of polymeric, fatty acids formed from $C_{18}$ unsaturated fatty acids (83% dimer and 17% trimer, totaling 275 g.) and pelargonic acid (24 g.). The baked film had a $\Delta Y$ of 4.3 after 500 hours' U.V. exposure, an impact value, both direct and reverse, of 130 in. lbs. and a Sward hardness of 63. For comparative purposes films were prepared and tested using a coconut oil alkyd of 28% oil length, said alkyd also being blended with Cymel 248–8 amino resin in the same way as was the adduct of this example. This alkyd melamine coating represents a premium type, high-bake coating as conventionally applied over an epoxy ester or other primer coat. This material exhibited a Sward hardness of 42, a direct impact of 50 in. lbs. and a reverse impact of 4 in. lbs. Its $\Delta Y$ was 16 after 500 hours' U.V. exposure.

Example II

In this operation the epoxy compound was that referred to above in Example I. It was employed (286 g.) in conjunction with 314 g. of an acid mixture containing approximately 298 g. of $C_{36}$ acid dimer, 6.5 g. of $C_{54}$ acid trimer and about 9.5 g. of $C_{18}$ acids containing but one carboxyl group, the latter acids being a portion of the unpolymerized acid remaining in the product mixture obtained on polymerizing the unsaturated $C_{18}$ acid starting material. This adduct was combined with Cymel 248-8 alkylated melamine formaldehyde resin (33%, based on adduct weight) and with 1.6 g. of $SnCl_4 \cdot 5H_2O$ catalyst rather than the stannous octoate catalyst used in the other examples hereof. This material had a direct impact of 100 in. lbs., a reverse impact of 160 in. lbs. and a Sward hardness of 52.

Example III

An enamel was prepared using the composition of Example II (but using stannous octoate in lieu of $SnCl_4 \cdot 5H_2O$) such that the product contained a 1/1 ratio of $TiO_2$ to resin solids. This enamel had a Hegman rating of 7+. It was reduced to 20 sec. viscosity (No. 4 Ford cup) and sprayed on asbestos siding. The sprayed panels were then cured for 30 minutes at 300° F. The panels had an excellent appearance, with a minimum of yellowing and chalking after an exterior exposure period of one year. Samples of the enamel exhibited good stability on being stored in a can for 8-10 months before being applied to a substrate.

Example IV

In this operation the adduct was prepared from 1-epoxyethyl-3,4-epoxycyclohexane (206 g.), the hydrogenated dimer acid of Example I (362 g.) and 31 g. of pelargonic acid. Following addition of the amino resin and a stannous octoate catalyst, there were obtained coatings having a ΔY of 5.3, a Sward hardness of 12 and both direct and reverse impact resistance of 160 in. lbs. This compared with a ΔY of 13+ for a premium type epoxy ester primer coat using the same general method, but with the adduct being replaced by an epoxy ester based on conventional bisphenol-A, epichlorohydrin epoxy resin and dehydrated castor acids.

Example V

An adduct was prepared using 301 g. of the Example I epoxide, 362 g. of the Example I dimer and 36 g. of oleic acid. Following compounding with stannous octoate and butylated melamine formaldehyde, films were obtained having impact resistance of 150 in. lbs. direct and 160 in. lbs. reverse. The ΔY was 2.8 after 138 hours' exposure to U.V. light. Sward hardness was 40.

Example VI

The operation of Example I was essentially repeated, but with 30 g. of myristic acid being substituted for the pelargonic acid. Here the cured films had a ΔY of 2.4 after 138 hours' U.V. exposure, while direct and reverse impact was 160 in. lbs. Sward hardness was 39.

I claim:
1. A heat curable resin composition comprising:
   (1) an adduct containing both epoxy groups and hydroxy groups, said adduct having an acid value below 20 and being a reaction product of
      (a) a fatty acid mixture comprised of dimer acids together with about 2 to 25% of $C_8$–$C_{18}$ monocarboxylic acids, and
      (b) an alicyclic diepoxide selected from the group consisting of those having one or the other of the following structural formulae:

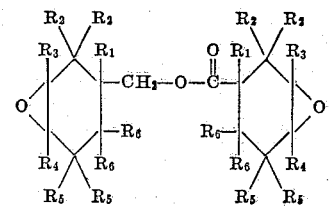

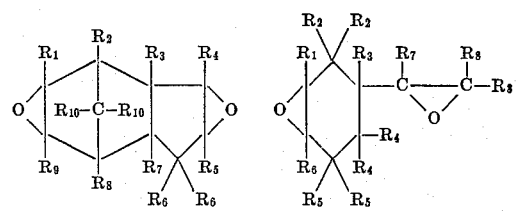

wherein the R's represent lower alkyl groups and hydrogen atoms;
   said reactants being employed in the proportion of about 1.5 to 2.5 gram-equivalents of the epoxide for each gram-equivalent of fatty acid mixture;
   (2) from 10 to 100% in terms of the weight of the epoxide-acid adduct of an amino resin prepared by the condensation of formaldehyde with a polyfunctional nitrogen compound selected from the group consisting of urea, melamine, triazine and diazine; and
   (3) from 0.5 to 10%, in terms of the weight acid-epoxy adduct of an esterification-etherification catalyst.

2. The composition of claim 1 wherein there is present an inert solvent and a pigment.

3. The composition of claim 1 wherein the catalyst is stannous octoate.

4. The composition of claim 1 wherein the amino resin consists of an alkylated condensate product of melamine and formaldehyde.

5. The composition of claim 4 wherein there is also present an inert solvent and a pigment, and wherein the catalyst is stannous octoate.

6. A method of preparing a heat curable resin composition which comprises reacting an alicyclic diepoxide of the type defined in claim 1 with a fatty acid mixture containing 75 to 98% of polycarboxylic, polymeric acids obtained by the polymerization of $C_{18}$ unsaturated fatty acids and from 2 to 25% of a $C_8$–$C_{18}$ monocarboxylic fatty acid, said reaction being conducted at temperatures of from about 150 to 225° C. and continued until the acid value of the reaction mixture falls to a level below 20, the reactants being employed in a proportion of about 1.5 to 2.5 gram-equivalents of the epoxide for each gram-equivalent of the fatty acid mixture; and blending the reaction product so obtained, in the presence of an inert solvent added to impart fluidity, with from 0.5 to 10% by weight of an esterification-etherification catalyst and from 10 to 100% by weight of an amino resin prepared by the condensation of formaldehyde with a polyfunctional nitrogen compound selected from the group consisting of urea, melamine, triazine and diazine.

7. The method of claim 6 wherein a pigment is also blended into the composition.

8. The method of claim 6 wherein the catalyst employed is stannous octoate and wherein the amino resin employed is an alkylated condensation product of melamine and formaldehyde.

(References on following page)

References Cited by the Examiner

UNITED STATES PATENTS

| | | | |
|---|---|---|---|
| 2,703,765 | 3/1955 | Osdal | 260—42 |
| 2,767,158 | 10/1956 | Schlenker et al. | 260—47 |
| 2,935,488 | 5/1960 | Phillips et al. | 260—18 |
| 2,970,231 | 1/1961 | Rogers et al. | 260—18 |
| 2,999,827 | 9/1961 | McGary et al. | 260—18 |
| 3,031,434 | 4/1962 | Radlove | 260—18 |
| 3,035,001 | 5/1962 | Tinsley et al. | 260—18 |

OTHER REFERENCES

Skeist: Epoxy Resins, Reinhold Plastics Applications Series, Reinhold Publishing Corp., New York, 1958, 293 pages (pages 1 and 2 of interest).

LEON J. BERCOVITZ, *Primary Examiner.*

R. W. GRIFFIN, C. W. IVY, *Assistant Examiners.*